Oct. 6, 1953   J. D. COCHIN   2,654,444
VEHICLE AXLE SUPPORTING DEVICE
Filed Oct. 10, 1949
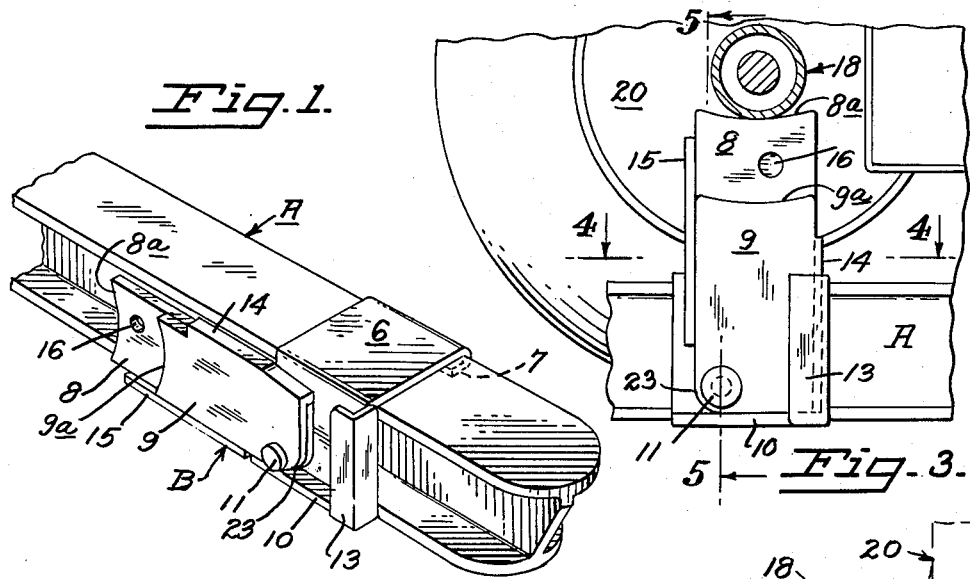
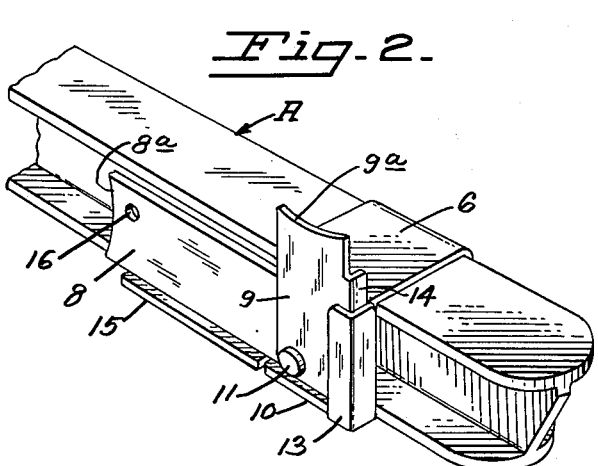
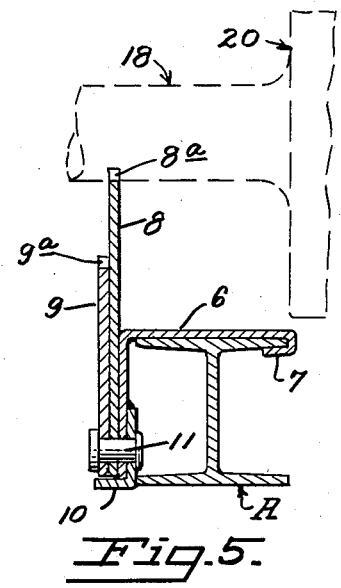
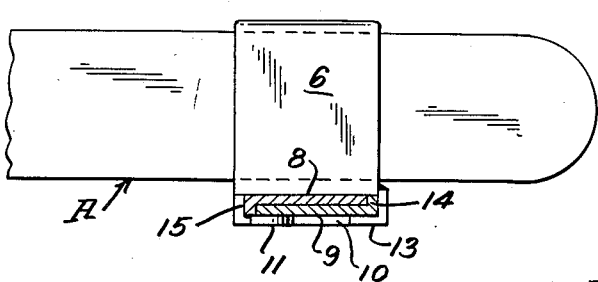
INVENTOR.
JOHN D. COCHIN
BY
Townsend and Townsend
ATTORNEYS Patented Oct. 6, 1953

2,654,444

UNITED STATES PATENT OFFICE 2,654,444

VEHICLE AXLE SUPPORTING DEVICE

John D. Cochin, San Francisco, Calif.

Application October 10, 1949, Serial No. 120,580

8 Claims. (Cl. 187—8.43)

1

This invention relates to an improved vehicle supporting device and more particularly relates to an improved supporting device which is adapted for use in association with a rail of a vehicle lift to support a vehicle axle adjacent an end thereof.

The particular embodiment of the present invention which is illustrated in the drawings and which will be described hereinafter in greater detail comprises, generally, a base plate adapted for removable attachment to a rail of a conventional vehicle lift of a type commonly employed in garages and service stations throughout the country, and a pair of jack blades of unequal length hinged about a common pivotal axis to the base plate. Each jack blade, in turn, is adapted to swing pivotally upwardly about said axis to a respective supporting position located above the top surface of the rail to which the base plate is attached, and to swing downwardly to a non-supporting position below the top surface of said rail. The supporting position of the longer of the two blades is spaced substantially farther above the top surface of the rail than the supporting position of the shorter blade. The blades are provided with mutual engagement or abutment members to permit them to be conveniently moved in unison upwardly or downwardly to their respective supporting and non-supporting positions, and the construction of the mutual abutment members is also such as to permit the longer blade to be moved downwardly independently of movement of the shorter blade and, conversely, to permit the shorter of the two blades to be moved upwardly independently of movement of the longer blade.

In the lubrication and repair of a vehicle, such as an automobile or a truck, it has become fairly well settled and established practice for operators of garages and service stations to elevate a vehicle above the ground through use of a hydraulic lift to permit convenient access to the under part of the vehicle. Conventional lifts usually incorporate a pair of parallel elongated rails which serve as the main or principal lifting supports for the vehicle, and these rails are customarily provided with a plurality of individual axle blocks or supports to engage each end of the front and rear axles of the supported vehicle. A common type of conventional rear axle support comprises a jack blade mounted hingedly with respect to an associated supporting rail to permit said blade to be swung upwardly and downwardly into axle supporting and non-supporting positions, respectively. As a rule, where this type of axle support

2 is employed, each jack blade on a lift is swung downwardly to its non-supporting position at the time that the vehicle is driven over the rails and prior to elevation of the lift. Before the lift is elevated the axle supports are moved into alignment directly beneath the vehicle axle and swung upwardly into their respective supporting positions. It has been found that in the servicing and repair of various makes of automobiles, some of the more recent types particularly require a jack blade of considerable length to reach high enough up through the under structure of the car to engage the axle of the vehicle. Moreover, because of the fact that the more conventional type of jack blade swings upwardly and downwardly about a pivotal axis which is disposed parallel to the longitudinal axis of the lift rails and therefore parallel to the supported vehicle that when an attempt is made to employ jack blades of any considerable length interference from certain under parts of the vehicle is encountered when an attempt is made to swing the blades upwardly into supporting position.

To overcome the above mentioned difficulties attendant with the use of the more conventional vehicle axle supports in the servicing and repair of vehicles of diverse makes, I provide a pair of rear axle supports wherein each support comprises a pair of jack blades of unequal lengths which are pivoted about a common axis disposed normal to the longitudinal axes of both the vehicle lift rails and a vehicle supported thereby. Thus, the said jack blades may be swung pivotally upwardly and downwardly to their respective supporting and non-supporting positions along a path of movement parallel to the lengthwise axes of the vehicle lift rails and the vehicle supported thereby. Because each vehicle support incorporates jack blades of unequal lengths an operator can selectively choose the blade best fitted for use in association with any particular vehicle.

A principal object of the present invention, therefore, is to provide a vehicle axle support of the type generally mentioned above which is provided with a plurality of jack blades of unequal lengths which can be moved selectively into supporting positions of varying relative heights above the rails of a vehicle lift.

Another principal object of the present invention is to provide a vehicle supporting device comprising a pair of jack blades supported pivotally about a common axis and wherein said common pivotal axis is disposed in a direction appropriate to permit the jack blades to be swung into and out of their respective supporting positions along a path of movement substantially parallel to the longitudinal axis of the supported vehicle body.

Another object of the present invention is to provide a vehicle supporting device comprising a pair of pivotally supported jack blades of unequal length which said blades, in turn, are provided with mutual abutment or engaging members which permit convenient movement of said blades in and out of their respective supporting position in unison, yet are nevertheless so constructed as to permit the shorter of the two blades to be moved into its respective supporting position without imparting corresponding movement to the longer of the two blades.

Another object of the present invention is to provide a vehicle supporting device of the character heretofore mentioned which is capable of rapid slidable removable attachment to a rail of a conventional vehicle lift.

Other objects of the present invention will become apparent upon reading the following specification and referring to the accompanying drawings in which similar characters of reference represent corresponding parts in each of the several views.

In the drawings:

Fig. 1 is a perspective view of the present supporting device operatively attached to a rail of a vehicle lift (shown fragmentarily) with both jack blades of said supporting device shown in non-supporting position.

Fig. 2 is similar to Fig. 1 but shows the shorter jack blade in supporting position and the longer blade in non-supporting position.

Fig. 3 is a view in side elevation of the supporting device showing the longer jack blade thereof in supporting engagement with an axle of a vehicle, with certain parts shown fragmentarily.

Fig. 4 is a sectional view taken on line 4—4 of Fig. 3.

Fig. 5 is a sectional view taken on line 5—5 of Fig. 3.

Referring now more particularly to the drawings there is illustrated fragmentarily and indicated generally at A, a conventional rail (comprising an I-beam) of a vehicle lift (not shown) to which has been removably secured a vehicle supporting device embodying the present invention, indicated generally at B.

The supporting device heretofore indicated generally at B comprises, more specifically, a base plate 6 formed in the nature of an angle piece, which, in turn, is provided or formed with a hook-shaped portion 7 adapted to removably slidably engage the lengthwise edge of the top surface of rail A.

A pair of jack blades, indicated at 8 and 9, respectively, are supported about a common pivotal axis by pin 11 which projects outwardly from base plate 6. Each jack blade is formed with an arcuate bearing surface adjacent its free end and these surfaces are indicated at 8ª and 9ª respectively. A horizontally projecting flange 10, formed integral with the base plate, and a vertically disposed angle piece 13 secured rigidly to the base plate function as stop members to effectively limit movement of blades 8 and 9 about their common pivotal axis 11 through approximately 90° of angular rotation. Each of the blades are rounded as at 23 to permit them to be swung upwardly from their respective horizontal non-supporting positions to their respective vertical supporting positions. Jack blade 9 is represented in the drawings as having a substantially shorter length than jack blade 8. Jack blade 9 is provided with a marginal flange 14, and blade 8 is provided with a marginal flange 15. Jack blade 8 is also preferably provided with an aperture or cut-out 16.

In operation, hook-shaped portion 7 of the base plate 6 is hooked over its slidable engagement with the lengthwise edge of the top surface of rail B. Preferably each supporting device of the present type is positioned with respect to a rail so that the hook-shaped portion 7 thereof engages the outside edge of the rail whereby the jack blades 8 and 9 are disposed adjacent the inside edge of the rail.

It is contemplated that the vehicle to be supported by a lift incorporating a pair of the present rear axle supporting devices will be driven over the rails of the lift when the latter have been lowered to a position approximately flush with the ground according to conventional practice. During this operation it is desirable to maintain both the jack blades out of the way of the under carriage of the automobile as the vehicle passes over them, and to this end blades are preferably swung downwardly to their horizontal non-supporting positions, as shown in Fig. 1, wherein it is seen that both blades occupy a position beneath the top surface of the rail A. After the vehicle has been driven over the lift and prior to elevating the lift, an operator may move the base plate of each supporting device slidably along the rail to which it is secured to a position beneath an end of the rear vehicle axle to be supported thereby. The operator may then swing upwardly into supporting position either of the jack blades 8 or 9. It is noted in this respect that if the operator has selected the longer jack blade 8, that movement of said blade upwardly from its horizontal non-supporting position as shown in Fig. 1 to its vertical supporting position as shown in Fig. 3, will impart corresponding movement to the shorter blade 9. More specifically, because of the mutual engagement established between the blades by way of flanges 14 and 15, upward movement imparted to blade 8 will cause jack blade 9 to move upwardly in unison with blade 8. It is believed evident that after both blades have been moved upwardly to vertical positions only the longer of the two blades will be in a position to actually bear against and support a vehicle axle. This arrangement of parts is illustrated in Figs. 3 and 5 which show both blades disposed vertically with only the longer jack blade 8 supporting a vehicle rear axle, indicated generally at 18, at a point thereon located inwardly of the adjacent wheel and tire, indicated generally at 20, carried by said axle.

With further reference to flanges 14 and 15 of the jack blades the drawings also illustrate how the shorter jack blade 9 may be moved upwardly from a horizontal non-supporting position to a vertical supporting position without imparting corresponding upward movement to jack blade 8. Conversely, the arrangement of flanges 14 and 15 permits movement of the longer jack blade 8 from a vertical position downwardly to its horizontal non-supporting position without imparting corresponding downward movement to jack blade 9.

Aperture 16 provided in jack blade 8 permits an operator to operate the jack blades from a location beyond manual reach of the blades. More specifically, aperture 16 presents a convenient nitch or hole into which an operator from a location beyond arm's reach of the blades, may insert a hooked rod (not shown) or the like to actuate the blades. In this connection, it is pointed out that an operator may, by engaging aperture 16 with a rod or a stick or the like, raise the two blades in unison to their vertical positions. Then, if it is desired to employ the shortest blade 9 as an axle support, the operator may through manipulation of the rod or stick push or move blade 8 downwardly to its horizontal non-supporting position leaving blade 9 standing upright in its supporting position.

Although it is contemplated that supporting devices of the type described in detail hereinabove will be found particularly adaptable for supporting rear axles of vehicles during lifting operations, such devices may, if desired be conveniently used to support front axles of vehicles or other suitable parts of the understructure of vehicles.

Although the present invention has been described in some detail by way of illustration and example, it is understood that certain changes and modifications may be made within the spirit of the invention and scope of the appended claims.

I claim:

1. A vehicle support device for use in association with a rail of a vehicle lift comprising, first and second jack blades of unequal length attached pivotally with respect to a said rail, each of said jack blades movable respectively upwardly to a supporting position above the top surface of said rail and downwardly longitudinally of said rail to a non-supporting position below the top surface of said rail, the upward supporting position of the longer of said jack blades being spaced substantially farther above the top surface of said rail than the supporting position of the shorter of said jack blades, the shorter of said jack blades movable to its supporting position independently of the longer of said jack blades.

2. A vehicle support device according to claim 1 and wherein both said jack blades are attached pivotally with respect to said rail about a common pivotal axis.

3. A vehicle support device according to claim 1 and wherein both said jack blades are provided with mutual engaging members arranged to permit movement of said blades in unison upwardly to their respective supporting positions and downwardly to their respective non-supporting positions and to permit movement of said first blade upwardly to its respective supporting position without imparting corresponding movement to said second blade and to permit movement of said second blade downwardly to its respective non-supporting position without imparting corresponding movement to said first blade.

4. A vehicle support device for use in association with a rail of a vehicle lift comprising, a pair of jack blades of unequal length mounted movably with respect to a said rail of a vehicle lift, each of said jack blades movable upwardly to a respective supporting position above the top surface of said rail and downwardly longitudinally of said rail to a respective non-supporting position, said pair of blades mounted pivotally about a common axis, the shorter blade movable to its supporting position independently of the longer blade the respective supporting position of the longer of said jack blades being spaced substantially further above the top surface of said rail than the respective supporting position of the shorter of said jack blades.

5. A vehicle support device according to claim 4 and wherein means associated with said blades are provided to permit upward and downward movement of both said blades in unison, said means arranged to permit movement of the shorter blade of said pair upwardly to its respective supporting position without imparting corresponding movement of the longer blade of said pair.

6. A vehicle support device for use in association with a rail of a vehicle lift comprising, a base plate, means to secure removably said base plate to a said rail of a vehicle lift, first and second jack blades of unequal length attached pivotally about a common axis to said base plate, each said jack blade movable about said common axis upwardly to a respective supporting position above the top surface of said rail and downwardly to a respective non-supporting position below the top surface of said rail, the supporting position of the longer of said jack blades being spaced substantially farther above the top surface of said rail than the supporting position of the shorter of said blades, a flange provided adjacent the edge of each said jack blade adapted to engage an adjacent edge of the other said jack blade whereby upward movement imparted to said first jack blade imparts corresponding movement to said second jack blade and downward movement imparted to said second jack blade imparts corresponding movement to said first jack blade, said flanges on said jack blades arranged to permit upward movement of said second jack blade without imparting corresponding movement to said first jack blade and to permit downward movement of said first jack blade without imparting corresponding movement to said second jack blade.

7. A vehicle supporting device comprising, a base plate adapted for attachment to a rail of a vehicle lift, and a pair of jack blades of unequal length hinged pivotally to said base plate about a common axis, each jack blade movable about said axis longitudinally of said rail upwardly to a respective supporting position and downwardly to a respective non-supporting position, the shorter of said jack blades movable to its supporting position independently of the longer of said jack blades.

8. A vehicle supporting device according to claim 7, and wherein the longer of said blades is provided with an aperture adjacent the top thereof to permit an operator to grip the blade and move the same pivotally.

JOHN D. COCHIN.

References Cited in the file of this patent

UNITED STATES PATENTS

| Number | Name | Date |
|---|---|---|
| 2,120,051 | Tully | June 7, 1938 |
| 2,158,399 | Carter | May 16, 1939 |
| 2,512,795 | Gurries | June 27, 1950 |